(12) United States Patent
Ogawa et al.

(10) Patent No.: US 9,357,303 B2
(45) Date of Patent: May 31, 2016

(54) SPEAKER APPARATUS

(75) Inventors: Masataka Ogawa, Hamamatsu (JP);
Takeshi Oishi, Hamamatsu (JP); Koji Suzuki, Hamamatsu (JP); Takamori Shimazu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 710 days.

(21) Appl. No.: 13/474,974

(22) Filed: May 18, 2012

(65) Prior Publication Data

US 2012/0294455 A1    Nov. 22, 2012

(30) Foreign Application Priority Data

May 20, 2011    (JP) .................. 2011-112972

(51) Int. Cl.
| | |
|---|---|
| *H04R 3/00* | (2006.01) |
| *H04R 3/12* | (2006.01) |
| *G08C 23/04* | (2006.01) |
| *H04N 5/64* | (2006.01) |
| *H04R 1/02* | (2006.01) |
| *H04R 5/04* | (2006.01) |

(52) U.S. Cl.
CPC ........ *H04R 3/12* (2013.01); *G08C 23/04* (2013.01); *H04N 5/642* (2013.01); *H04R 1/028* (2013.01); *G08C 2201/40* (2013.01); *H04R 5/04* (2013.01); *H04R 2430/01* (2013.01); *H04R 2499/15* (2013.01)

(58) Field of Classification Search
USPC .............. 381/77, 56–60; 434/118, 169, 185; 348/734
See application file for complete search history.

(56) References Cited

U.S. PATENT DOCUMENTS

| | | | |
|---|---|---|---|
| 4,386,436 A | * | 5/1983 | Kocher et al. .............. 455/151.4 |
| 5,386,251 A | | 1/1995 | Movshovich |

(Continued)

FOREIGN PATENT DOCUMENTS

| | | |
|---|---|---|
| CN | 1352517 A | 6/2002 |
| CN | 1941820 A | 4/2007 |

(Continued)

OTHER PUBLICATIONS

Notification of First Office Action issued in Corresponding Chinese Patent Application No. 201210158948.0 dated May 6, 2014. English translation provided.

*Primary Examiner* — Davetta W Goins
*Assistant Examiner* — Kuassi Ganmavo
(74) *Attorney, Agent, or Firm* — Rossi, Kimms & McDowell LLP

(57) ABSTRACT

A speaker apparatus includes: a speaker operable to emit a sound; a receiver operable to receive an operation signal for operating an external apparatus; a relay section; a storage operable to store correspondence between operation information and operation signals that includes a first operation signal and a second operation signal; and a controller: when the operation signal received by the receiver is the first operation signal, operable to cause the relay section to transmit the operation signal received by the receiver to the external apparatus, and operate the speaker apparatus in accordance with operation information that corresponds to the first operation signal; and when the operation signal received by the receiver is the second operation signal, operable to prevent the relay section from transmitting the operation signal received by the receiver to the external apparatus.

7 Claims, 3 Drawing Sheets

(56) References Cited

U.S. PATENT DOCUMENTS

| | | | |
|---|---|---|---|
| 5,786,921 A * | 7/1998 | Wang et al. | 398/128 |
| 5,815,108 A * | 9/1998 | Terk | 341/176 |
| 5,864,591 A * | 1/1999 | Holcombe | 398/209 |
| 6,028,527 A * | 2/2000 | Soenen et al. | 340/5.26 |
| 6,724,442 B1 * | 4/2004 | Zyskowski et al. | 348/734 |
| 7,484,234 B1 * | 1/2009 | Heaton et al. | 725/80 |
| 2002/0149704 A1 | 10/2002 | Kano et al. | |
| 2003/0104844 A1 * | 6/2003 | Chen | H04M 1/6041 455/569.2 |
| 2003/0135868 A1 * | 7/2003 | DeGeorge | 725/152 |
| 2003/0195969 A1 * | 10/2003 | Neuman | 709/229 |
| 2004/0143847 A1 * | 7/2004 | Suzuki | H04B 1/202 725/61 |
| 2005/0191999 A1 * | 9/2005 | Tezuka | G08C 17/02 455/420 |
| 2010/0158533 A1 * | 6/2010 | Belz et al. | 398/106 |
| 2011/0291817 A1 * | 12/2011 | Maegaki et al. | 340/12.22 |

FOREIGN PATENT DOCUMENTS

| | | |
|---|---|---|
| CN | 201270589 Y | 7/2009 |
| JP | 09-275591 A | 10/1997 |
| JP | 2007-060063 A | 3/2007 |
| JP | 2009-267956 A | 11/2009 |

* cited by examiner

SPEAKER APPARATUS

BACKGROUND OF THE INVENTION

The present invention relates to a speaker apparatus placed in front of a television set.

In recent years, as described in JP-A-2009-267956, a speaker apparatus including a horizontally elongated housing has often been placed below a television screen. Such a speaker apparatus including a horizontally elongated housing may be used by being placed in front of a television set so as to be separated therefrom (hereinafter, such a speaker apparatus is called a "bar speaker").

However, a television set is often provided at its lower part with a light receiver for receiving an operation signal such as infrared rays outputted from a remote control device (hereinafter referred to as a "remote control"). Since the bar speaker is placed in front of the television set, the light receiver of the television set is unfortunately hidden by the bar speaker. Accordingly, the television set cannot receive an operation signal from the remote control.

Therefore, as described in JP-A-09-275591, for example, a relay apparatus (which may also be referred to as a "repeater apparatus") for relaying an operation signal from a remote control is conceivably interposed between the remoter control and television set. When the remote control is operated by a user and an operation signal is transmitted to the relay apparatus, the relay apparatus transmits, to the television set, the operation signal received from the remote control.

On the other hand, in recent years, information of an operation signal transmitted from a remote control has been learned by a speaker apparatus, and the apparatus has also been operated in accordance with the operation signal from the remote control. In this case, a user can operate a plurality of apparatuses by using the single remote control.

When a user listens to sounds of a television set by using a speaker apparatus such as the bar speaker provided separately from the television set, it is preferable that a sound level of the television set is reduced and the user mainly listens to sounds of the speaker apparatus. Suppose that the speaker apparatus relays a received operation signal and learns information of the operation signal from a remote control, and the apparatus is also operated in accordance with the operation signal as mentioned above. In that case, for example, when the user operates the remote control with the intention of increasing a sound level of the speaker apparatus, not only the sound level of the speaker apparatus but also the sound level of the television set is increased, thereby exerting an adverse influence on acoustic effects.

SUMMARY

It is therefore an object of the invention to provide a speaker apparatus that prevents an adverse influence on acoustic effects even when the speaker apparatus relays an operation signal and the apparatus is also operated in accordance with the operation signal.

In order to achieve the object, according to the invention, there is provided a speaker apparatus comprising: a speaker operable to emit a sound; a receiver operable to receive an operation signal for operating an external apparatus; a relay section; a storage operable to store correspondence between operation information and operation signals that includes a first operation signal and a second operation signal; and a controller: when the operation signal received by the receiver is the first operation signal, operable to cause the relay section to transmit the operation signal received by the receiver to the external apparatus, and operate the speaker apparatus in accordance with operation information that corresponds to the first operation signal; and when the operation signal received by the receiver is the second operation signal, operable to prevent the relay section from transmitting the operation signal received by the receiver to the external apparatus.

The second operation signal may correspond to operation information for increasing a sound level.

The second operation signal may correspond to operation information for canceling a quiet mode.

When the second operation signal is received and then an operation signal is continuously received before a given period of time elapses, the controller may prevent the relay section from transmitting the continuously received operation signal.

The controller may receive a learning mode and associate an operation signal, which is received during the learning mode, with operation information, which is received during the learning mode, to update the correspondence stored in the storage.

The relay section may include a delay section operable to delay output of the received operation signal.

DETAILED DESCRIPTION OF EMBODIMENTS

Figure 1A:
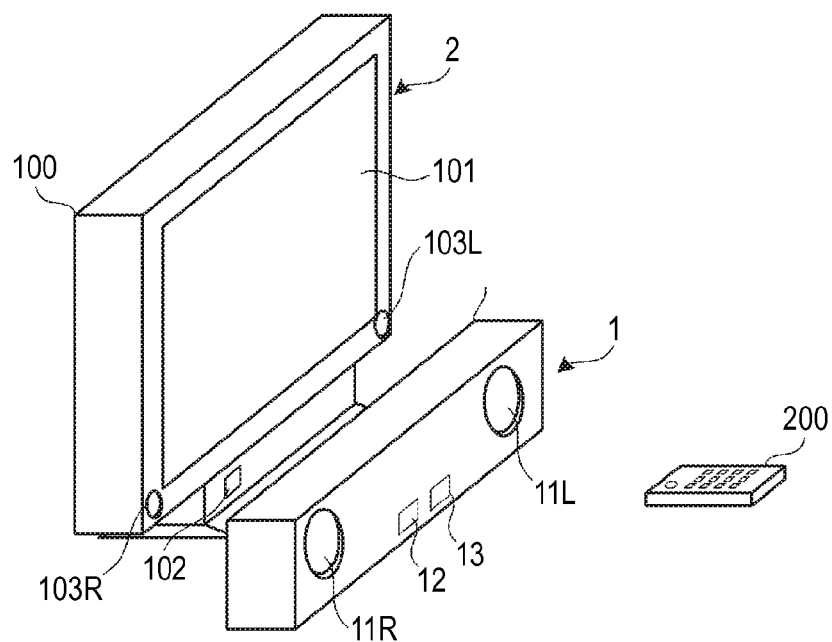
FIGS. 1A and 1B are schematic diagrams illustrating how a speaker apparatus and a television set are placed.
Figure 1B:
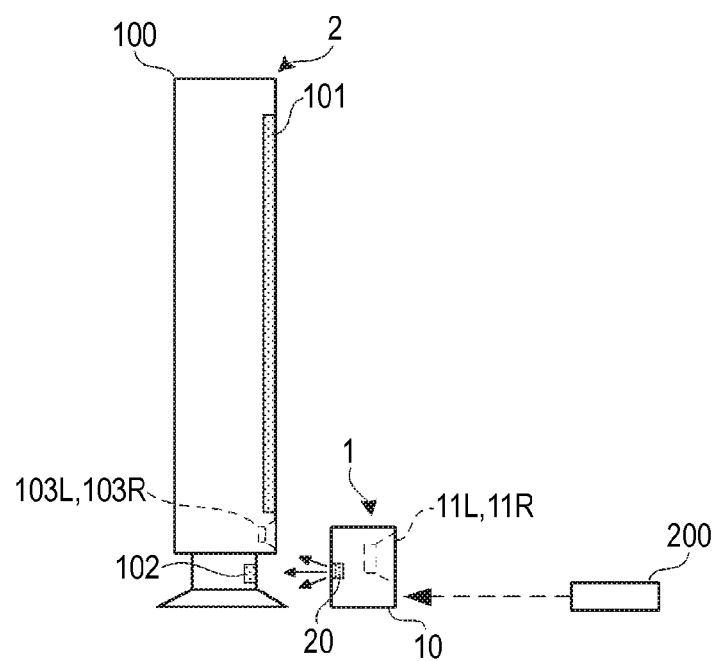

FIGS. 1A and 1B are schematic diagrams illustrating how a speaker apparatus according to an embodiment of the present invention and a television set are placed. FIG. 1A is a perspective view, and FIG. 1B is a side view. A speaker apparatus 1 described in the present embodiment is a bar speaker having a rectangular parallelepiped housing 10 whose size is large in a lateral direction and small in a height direction. The speaker apparatus 1 is placed in front of a television set 2.

The television set 2 includes a light receiver 102 for receiving infrared rays (light signal) serving as an operation signal. The light receiver 102 receives infrared rays transmitted from a remote control 200 for the television set 2. The light receiver 102 is provided at a panel located below a display screen 101 included in a housing 100. Further, the housing 100 is provided at its lower right and left parts with a speaker 103R and a speaker 103L. The remote control 200 emits infrared rays corresponding to, for example, operation signals for turning ON/OFF the power of the television set 2, and operation signals for increasing/reducing sound levels of the speakers 103R and 103L. In the present embodiment, since the speaker apparatus 1 is placed in front of the television set 2, the light receiver 102 is blocked by the speaker apparatus 1, and the light receiver 102 cannot directly receive the infrared rays from the remote control 200.

The speaker apparatus 1 includes a plurality of speakers (two speakers in the present embodiment), i.e., a speaker 11R and a speaker 11L, at a front face of the housing 10. The speaker apparatus 1 is connected to the television set 2 via unillustrated wiring, thus receiving a sound signal from the television set 2 and emitting sounds of the television set 2 from the speakers 11R and 11L.

At positions below an approximate center of the front face of the housing 10, the speaker apparatus 1 includes two light receivers, i.e., light receivers 12 and 13, for receiving infrared rays from the remote control 200. The speaker apparatus 1 is placed so that a path between the light receiver 102 of the television set 2 and the remote control 200 is blocked; hence, when a user operates the remote control 200 while pointing the remote control 200 at the television set 2, the light receivers 12 and 13 will receive infrared rays from the remote control 200.

The speaker apparatus 1 further includes a light emitter 20 at a back face of the housing 10. Upon reception of infrared rays from the remote control 200 by the light receiver 12, the speaker apparatus 1 outputs, from the light emitter 20, the infrared rays received by the light receiver 12 (in other words, the infrared rays are passed through the speaker apparatus 1) as indicated by solid arrows in FIG. 1B. As a result, the speaker apparatus 1 functions as a relay apparatus for relaying an operation signal from the remote control 200.

Moreover, the speaker apparatus 1 has a so-called "remote control learning function" in which upon reception of infrared rays from the remote control 200 by the light receiver 13, the speaker apparatus 1 transmits the infrared rays to a microcontroller 52 (see FIG. 2) of the speaker apparatus 1, and the speaker apparatus 1 is also operated in accordance with an operation signal outputted from the remote control 200.

Figure 2:
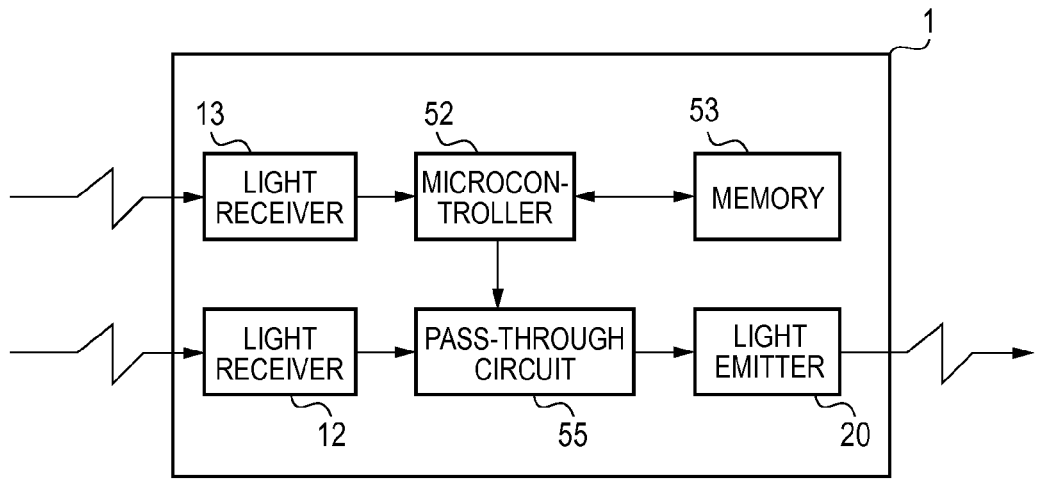
FIG. 2 is a block diagram illustrating components of the speaker apparatus.

FIG. 2 is a block diagram illustrating components of the speaker apparatus 1 (concerning the relaying function and the remote control learning function). In addition to the light receivers 12 and 13 and the light emitter 20, the speaker apparatus 1 includes the microcontroller 52, a memory 53 and a pass-through circuit 55.

The memory 53 serves as a rewritable storage and stores, for example, an operation program for the microcontroller 52, and a table in which correspondences between operation signals and operation information are provided.

The microcontroller 52 reads the operation program from the memory 53 and expands the program into a RAM (not illustrated), thereby performing various operations. In the present embodiment, the microcontroller 52 receives an operation signal outputted from the remote control 200 and received by the light receiver 13, makes reference to the above-mentioned table stored in the memory 53, and allows the speaker apparatus 1 to execute an operation corresponding to the operation signal outputted from the remote control 200. For example, a power ON/OFF operation signal from the remote control 200 and operation information thereof are provided in the table in the memory 53 so that the operation signal and the operation information are associated with each other; thus, when the power ON/OFF operation signal is received from the remote control 200, the microcontroller 52 makes reference to the table, thus performing an operation for turning ON/OFF the power of the speaker apparatus 1.

The above-mentioned table is created upon designation of a learning mode by the user. Upon designation of a learning mode by the user, the microcontroller 52 associates an operation signal, which is subsequently received from the remote control 200, with operation information thereof to update the information stored in the memory 53, and thus learns the operation signal outputted from the remote control 200. For example, an unillustrated power button provided at the housing is pressed and held, and thus the microcontroller 52 receives designation of a learning mode. Subsequently, for example, when the power button at the housing is pressed down, a power learning mode is established; then, upon reception of infrared rays by the light receiver 13, the received operation signal is associated with a power ON/OFF operation, and the table in the memory 53 is updated. Thus, the microcontroller 52 learns the power ON/OFF operation signal emitted from the remote control 200. Then, upon reception of the infrared rays corresponding to the power ON/OFF operation signal by the light receiver 13 during normal operation, the microcontroller 52 makes reference to the table in the memory 53 using the operation signal and performs an operation for turning ON/OFF the power of the apparatus. Note that in the speaker apparatus 1, correspondences between operation signals, used for remote controls provided by various television set manufacturers, and operation information thereof may be registered in the table in advance. In that case, an operation for allowing the microcontroller 52 to learn an operation signal from the remote control 200 upon designation of a learning mode is not essential.

On the other hand, the microcontroller 52 performs control to turn ON/OFF a switch of the pass-through circuit 55 serving as a switch circuit.

The switch of the pass-through circuit 55 is turned ON in accordance with the control performed by the microcontroller 52; thus, an operation signal (infrared rays), outputted from the remote control 200 and received by the light receiver 12, is passed through the pass-through circuit 55 to the light emitter 20, and the infrared rays are relayed to the light receiver 102 of the television set 2.

As described above, the speaker apparatus 1 according to the present embodiment relays an operation signal, outputted from the remote control 200 and received by the light receiver 12, to the television set 2, and receives the operation signal by the light receiver 13 so that the speaker apparatus 1 is also operated in accordance with the received operation signal. For example, upon reception of the power ON/OFF operation signal, the speaker apparatus 1 and the television set 2 are operated as follows. When the speaker apparatus 1 and the television set 2 are in standby states, both of the speaker apparatus 1 and the television set 2 each make a transition to a power ON state upon reception of the power ON/OFF operation signal; on the other hand, when the speaker apparatus 1 and the television set 2 are in the power ON states, both of the speaker apparatus 1 and the television set 2 each perform a power OFF operation (or make a transition to the standby state) upon reception of the power ON/OFF operation signal. Thus, the power of the speaker apparatus 1 and the power of the television set 2 are allowed to be turned ON/OFF in conjunction with each other.

In this embodiment, as for particular operation signals such as an operation signal for enabling/disabling a mute mode and an operation signal for increasing the sound level, the microcontroller 52 turns OFF the switch of the pass-through circuit 55, thereby preventing the operation signals from being relayed. As illustrated in FIG. 1, the television set 2 is provided with the speakers 103R and 103L, and sounds of the television set 2 are also emitted from the speakers 103R and 103L. Accordingly, sounds emitted from the speakers 11R and 11L of the speaker apparatus 1 are mixed with sounds emitted from the speakers 103R and 103L of the television set 2, thus creating an unfavorable situation in terms of acoustic effects. Therefore, in general, it is preferable that the sound level of the television set 2 is reduced and the user mainly listens to sounds of the speaker apparatus 1. However, in a case where an operation signal received by the speaker apparatus 1 is relayed, information of an operation signal from the remote control 200 is learned, and the speaker apparatus 1 is also operated in accordance with the operation signal, the following problem might occur. For example, when the user operates the remote control 200 with the intention of increasing the sound level of the speaker apparatus 1, not only the sound level of the speaker apparatus 1 but also the sound level of the television set 2 might be increased, thereby exerting an adverse influence on acoustic effects. Or in a case where the television set 2 is put in a mute mode and the user listens to only sounds of the speaker apparatus 1, the following problem might occur. When the user operates the remote control 200 with the intention of putting the speaker apparatus 1 in a mute mode, the speaker apparatus 1 is put in the mute mode, but the mute mode of the television set 2 might be cancelled, so that sounds will be emitted from the television set 2.

To cope with the above problems, as for the particular operation signals such as an operation signal for enabling/disabling the mute mode and an operation signal for increasing the sound level, the microcontroller 52 turns OFF the switch of the pass-through circuit 55, thereby preventing the operation signals from being relayed as mentioned above. As a result, unintentional increase in the sound level of the speaker apparatus 1 and cancellation of the mute mode are prevented, thus preventing an adverse influence on acoustic effects.

Figure 3:
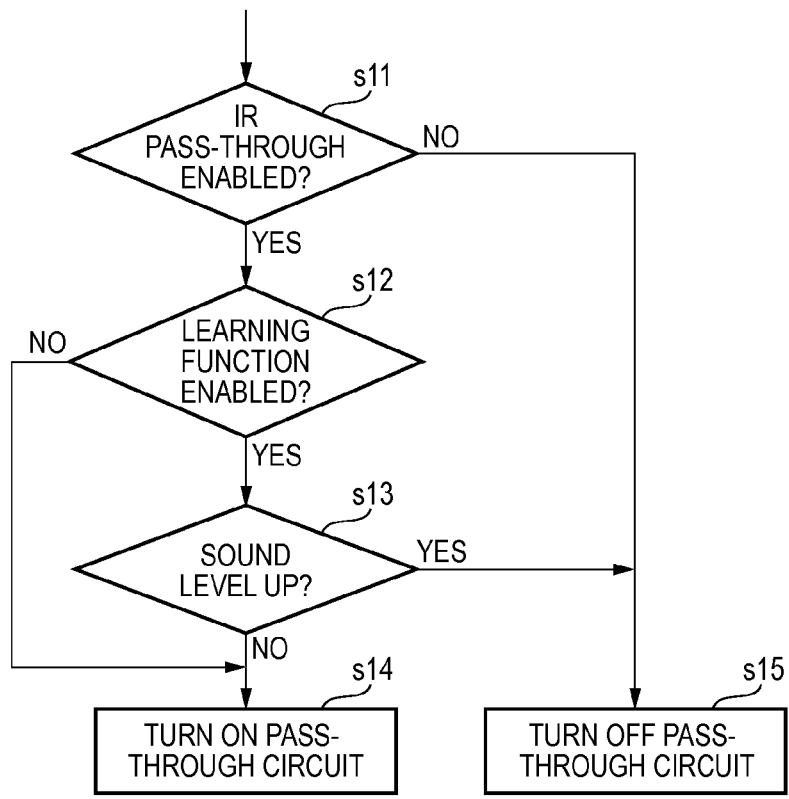
FIG. 3 is a flow chart illustrating operations of the speaker apparatus.

FIG. 3 is a flow chart illustrating operations of the speaker apparatus 1 (microcontroller 52). Upon reception of infrared rays by the light receiver 13, the microcontroller 52 performs the operations illustrated in the flow chart.

First, the microcontroller 52 determines whether or not an infrared ray pass-through function is enabled (s11). When the pass-through function is turned OFF by the user by using an operation section (not illustrated) provided at the housing of the speaker apparatus 1 or a dedicated remote control (not illustrated) of the speaker apparatus 1, the microcontroller 52 turns OFF the switch of the pass-through circuit 55 to make settings so that an operation signal received by the light receiver 12 will not be relayed (s15).

On the other hand, upon determination that the pass-through function is enabled (i.e., upon determination that the pass-through function is turned ON by the user), the microcontroller 52 determines whether or not a learning function is enabled (s12). When the learning function is turned OFF by the user by using the operation section (not illustrated) provided at the housing of the speaker apparatus 1 or the dedicated remote control (not illustrated) of the speaker apparatus 1 similarly to the above description, the microcontroller 52 turns ON the switch of the pass-through circuit 55 to make settings so that an operation signal received by the light receiver 12 will be relayed (s14). In this case, only the relaying function of the speaker apparatus 1 is enabled; hence, even when the speaker apparatus 1 receives an operation signal from the remote control 200, the speaker apparatus 1 does not perform an operation corresponding to the operation signal.

Upon determination that the learning function is enabled, the microcontroller 52 makes reference to the table in the memory 53 using the operation signal received by the light receiver 13, and determines whether or not the operation signal is a particular operation signal, e.g., whether or not the operation signal corresponds to an operation for increasing a sound level in this embodiment (s13). When the received operation signal is not the particular operation signal, the microcontroller 52 turns ON the switch of the pass-through circuit 55 to make settings so that the operation signal received by the light receiver 12 will be relayed (s14).

On the other hand, upon determination that the received operation signal is the particular operation signal, the microcontroller 52 turns OFF the switch of the pass-through circuit 55 to make settings so that the operation signal received by the light receiver 12 will not be relayed (s15). Thus, the relay of the operation signal is interrupted, thereby preventing increase in the sound level of the television set 2 and cancellation of the mute mode.

Note that the microcontroller 52 performs a determination process in which reference is made to the memory 53, for example; hence, it might take time to perform the determination process, and an operation signal might be transmitted from the light emitter 20 before the relay of the operation signal is interrupted. Further, in general, a particular operation such as an operation for increasing the sound level is often performed by pressing and holding a button of a remote control, and therefore, operation signals are often outputted in a continuous manner. In this case, when it is determined whether or not each of the operation signals, which are continuously received, is the particular operation signal, it might eventually be impossible to interrupt the relay of the operation signals.

Figure 4:
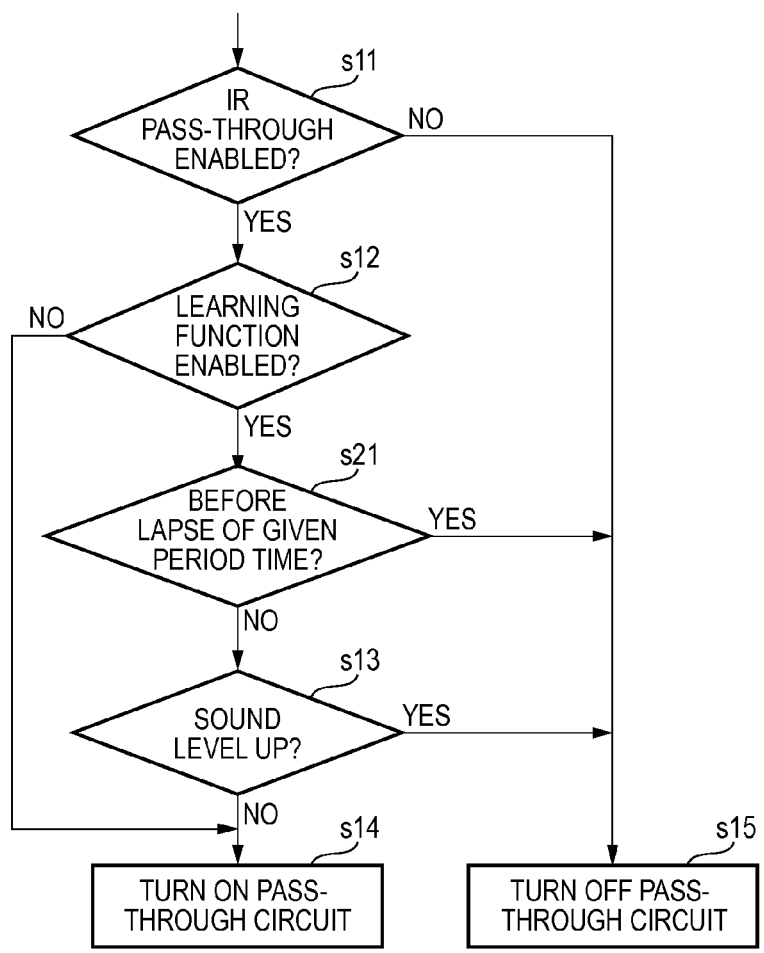
FIG. 4 is a flow chart illustrating operations of the speaker apparatus according to an application of the present invention.

To cope with such problems, when the particular operation signal is once received, the microcontroller 52 preferably performs operations illustrated in FIG. 4 (note that steps similar to those in FIG. 3 are identified by the same reference characters and the description thereof will be omitted). In the operation flow of FIG. 4, upon determination that the learning function is enabled, the microcontroller 52 then performs the operation of s21. Specifically, until a given period of time elapses since a time at which the reception of the last particular operation signal has been determined, the microcontroller 52 turns OFF the switch of the pass-through circuit 55 without performing any determination process, and thus interrupts the relay (s21). In other words, it is assumed that the same operation signals are continuously received until the given period of time elapses. The given period of time is set to a time (e.g., about 0.5 seconds) in which a different button is not pressed down by the user.

As described above, when the particular operation signal is once received, the microcontroller 52 determines that the operation signals, continuously received before the lapse of the given period of time, are outputted by pressing and holding of a button of the remote control 200 by the user, and the microcontroller 52 interrupts the relay of the operation signals without making reference to the table in the storage, thus making it possible to prevent the relay of the particular operation signals.

Note that although an example in which the light receiver 13 for remote control learning is provided separately from the light receiver 12 for the relaying function has been described in the present embodiment, only a single light receiver may be provided. When a single light receiver is provided in the block diagram of FIG. 2, infrared rays received by the light receiver may be inputted to the microcontroller 52 and the pass-through circuit 55 through branched paths. Alternatively, the microcontroller 52 may also perform functions of the pass-through circuit 55. For example, the microcontroller 52 may regenerate an operation signal having the same encoded information as that of an operation signal of the remote control 200, and may allow the light emitter 20 to emit the regenerated signal. Also in that case, the microcontroller 52 can implement functions similar to those of the pass-through circuit 55.

Note that in the present embodiment, a received operation signal is immediately passed through the pass-through circuit 55 when the switch of the pass-through circuit 55 is ON.

Figure 5:
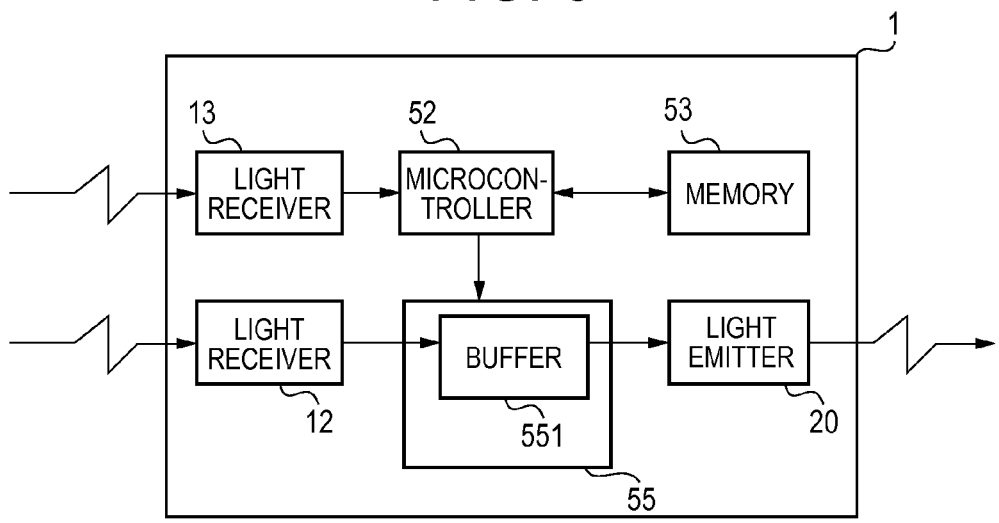
FIG. 5 is a block diagram illustrating components of a speaker apparatus according to a variation of the present invention.

However, as illustrated in FIG. 5, which is a block diagram according to a variation of the present invention, the speaker apparatus 1 may include, in the pass-through circuit 55, a buffer 551 for temporarily storing an operation signal to delay output of the operation signal, and the buffered operation signal may be prevented from being passed through the pass-through circuit 55 until a determination on whether or not the operation signal is the particular operation signal has been made by the microcontroller 52. In that case, the relay of an operation signal is delayed, but an operation signal that should be interrupted can be interrupted with reliability. Furthermore, also when the microcontroller 52 regenerates an operation signal having the same encoded information as that of an operation signal of the remote control 200 and allows the light emitter 20 to emit the regenerated signal, the regeneration may be delayed until the determination is ended, thus making it possible to implement functions similar to those of the pass-through circuit 55.

According to an aspect of the invention, the particular operation signal such as an operation signal for increasing a sound level or an operation signal for canceling a quiet mode (i.e., canceling a mute state) is not relayed to the external apparatus. Thus, even when the external apparatus is a television set including a speaker, an unintentional increase in sound level of the television set will be prevented, thereby making it possible to prevent an adverse influence on acoustic effects.

In general, a particular operation such as an operation for increasing the sound level is often performed by pressing and holding a button of a remote control, and therefore, operation signals are often outputted in a continuous manner. Since the controller is operated to determine whether or not there is information relevant to the particular operation signal by making reference to the storage, the operation signal might be relayed before transmission to a transmitter is stopped. In that case, when the controller determines whether or not each of the operation signals, which have been continuously received, is the particular operation signal, it might eventually be impossible to interrupt the relay of the operation signals. Therefore, in the invention, when reception of the particular operation signal is once determined, the relay of the operation signals, which are subsequently transmitted in a continuous manner, is stopped without making reference to the storage, thus making it possible to prevent the relay of the particular operation signal.

Further, the storage may store correspondences between several operation signals and operation information in advance. Alternatively, the controller may receive a learning mode and associate an operation signal, received during the learning mode, with received operation information to update the information stored in the storage, thus allowing the speaker apparatus to be adaptable to any remote control.

According to an aspect of the invention, even when the speaker apparatus relays an operation signal and the apparatus is also operated in accordance with the operation signal, the speaker apparatus is capable of preventing an adverse influence on acoustic effects.

What is claimed is:

1. A speaker apparatus comprising:
a speaker operable to emit a sound;
a receiver operable to receive an operation signal for operating an external apparatus;
a relay section;
a storage operable to store correspondence between operation information and operation signals that includes a first operation signal and a second operation signal; and
a controller configured to:
operate the speaker apparatus in accordance with operation information that corresponds to the first and second operation signals;
refer to the storage and determine whether the operation signal received by the receiver is the first operation signal or the second operational signal;
when the operation signal received by the receiver is determined to be the first operation signal, cause the relay section to transmit the operation signal received by the receiver to the external apparatus; and
when the operation signal received by the receiver is determined to be the second operation signal, prevent the relay section from transmitting the operation signal received by the receiver to the external apparatus.

2. The speaker apparatus according to claim 1, wherein the second operation signal corresponds to operation information for increasing a sound level.

3. The speaker apparatus according to claim 1, wherein the second operation signal corresponds to operation information for canceling a quiet mode.

4. The speaker apparatus according to claim 1, wherein when the second operation signal is received and then an operation signal is continuously received before a given period of time elapses, the controller prevents the relay section from transmitting the continuously received operation signal.

5. The speaker apparatus according to claim 1, wherein the controller receives a learning mode and associates an operation signal, which is received during the learning mode, with operation information, which is received during the learning mode, to update the correspondence stored in the storage.

6. The speaker apparatus according to claim 1, wherein the relay section includes a delay section operable to delay output of the received operation signal.

7. The speaker apparatus according to claim 1, wherein:
the relay section includes an ON/OFF switch,
the controller is further configured to control turning ON/OFF the switch.

* * * * *